No. 772,517.

Patented October 18, 1904.

UNITED STATES PATENT OFFICE.

SAMUEL RIDGWAY KENNEDY, OF PHILADELPHIA, PENNSYLVANIA.

PROCESS OF MAKING MILK-SUGAR.

SPECIFICATION forming part of Letters Patent No. 772,517, dated October 18, 1904.

Application filed August 8, 1903. Serial No. 168,757. (No specimens.)

*To all whom it may concern:*

Be it known that I, SAMUEL RIDGWAY KENNEDY, a citizen of the United States, residing at Philadelphia, in the county of Philadelphia and State of Pennsylvania, have invented a new and useful Improvement in Processes of Manufacturing Sugar of Milk and Milk Salts, of which the following is a specification.

Sugar of milk is now produced by partly-chemical means from milk-whey, the product being about two and a half pounds per hundred pounds of whey. By my improved process I produce from four to five pounds or more from one hundred pounds of skimmed milk, and rather more from whole milk, and this by purely mechanical means in a much shorter time and without in any way injuring the milk, which is of even greater value after the sugar of milk or the sugar of milk and salts are extracted than it was before.

It is understood that by my improved process I can take out either the sugar of milk alone, that is relatively free from milk salts, or I can take out the sugar and salts together, depending upon the length of time I allow the crystallization to continue, as hereinafter described, and when I speak of "sugar of milk" hereinafter I include it both alone and with the salts unless otherwise stated.

My process is also applicable to whole milk, skimmed milk, cream, whey, or any part of milk containing sugar or salts, and when I speak of "milk" I intend to include any of these parts or modifications of milk.

My process in detail is as follows: The milk is first condensed or evaporated in an ordinary vacuum-pan to between 11° and 21° Baumé. It is then run into cans or other vessels and allowed to stand at a temperature of near to 32° Fahrenheit until the sugar of milk crystallizes, or, preferably, it may be run over cooling pipes or coils at about 32°, when the crystallization will take place practically at once. After the sugar of milk crystallizes the milk is placed in an ordinary sugar-centrifugal having the customary perforated sides and lined with a suitable filtering material and the milk thrown out, leaving the sugar of milk on the surface of the filter. This sugar of milk will probably not be absolutely pure, but will contain, in addition to whatever salts may have crystallized, a trace of albumen and fat adhering to the crystals of sugar. This crude product is now sprinkled with alkaline water at a temperature below 50° Fahrenheit, which will wash out the salts, fat, and albumen, and the centrifugal is again rotated to throw off the wash-water. After this washing process is repeated a sufficient number of times, the last time with pure water without the alkali, the sugar of milk will be found to be pure and to require no further refining.

The temperature at which the milk is condensed is not of great importance, the higher temperatures slightly increasing the product of sugar and the size of the crystals, but is liable to give to the milk more or less of a cooked flavor, as is well known in the art. About 113° Fahrenheit would be a suitable temperature to give a good output of sugar and leave also a fine flavored condensed milk. The temperature should be regulated for the quality of condensed milk desired, as is the present practice at condenseries. The sugar of milk can be taken out no matter what the temperature may be.

The degree of condensation of the milk has an important bearing on the quantity and purity of the sugar extracted and the rapidity with which it can be obtained. Between, say, 11° and 27° Baumé the greater the condensation the more rapidly will crystallization take place; but also the greater will be the proportion of salts that will crystallize with the sugar. I believe it probable that at all degrees of condensation the sugar really crystallizes first, or begins to crystallize first, and the salts more slowly; but at high condensations the whole thing takes place so rapidly that it would be difficult to get the sugar without the salts. The conclusion is therefore obvious that if it is desired to extract the sugar and leave the salts in the milk the condensation should not go above about 21° Baumé; but if it is desired to extract the sugar and salts together the condensation may be run as high as 27° Baumé. Above 27° I find the product too thick to work satisfactorily, and, while sugar may be obtained, I do not think it desirable to go above 27° Baumé. Also below 11° Baumé, although sugar might be obtained, it would be too slow to be of great practical value. The degree of condensation is largely regulated by the quality of condensed milk desired.

As a filtering medium I am using grass-linen; but any linen or muslin or other similar cloth having a mesh of suitable size may be used. It is of course an advantage to use as open a mesh as will stop the crystals of sugar.

When condensed to about 21° Baumé and refrigerated at near 32° Fahrenheit, the sugar of milk should crystallize sufficiently in about twenty-four hours. The milk should be examined from time to time by dipping up some on a stick or paddle, when, if ready for filtering, the crystals can be seen in the milk. If it is desired to get the sugar and allow much of the salts to remain in the milk, it should be filtered as soon as these crystals appear in fair quantity, the proper appearance of which can only be learned by experience. When the refrigeration takes place by running over refrigerating-coils, the crystals will form almost immediately—that is, in a few minutes.

As a washing-water I use pure distilled water made alkaline with ammonia—about two ounces of ammonia to a gallon of water. The exact strength is not material. Any other alkali may be used, such as potassium or sodium hydrate or lime-water; but I have preferred the ammonia, as it easily dissolves and evaporates. This washing with alkaline water renders the sugar of milk practically pure, washes out the salts and albumen, and saponifies and washes out any oils or fats adhering to the sugar, and when used at a temperature below 50° Fahrenheit does not dissolve any substantial amount of the sugar.

To produce the salts of milk, the process is substantially the same; but preferably the condensation should be greater, approximating 27° Baumé or more. The crystallization should be allowed to continue somewhat longer. The salts are finally crystallized out by the evaporation of the wash-water and may be refined by any of the known methods.

Having, as above, fully described my invention and the best mode known to me of using the same, what I claim, and desire to secure by Letters Patent, is—

1. The process of producing sugar of milk and milk salts by condensing the milk, causing the sugar and salts to crystallize and filtering out the crystallized sugar and salts.

2. The process of manufacturing sugar of milk and milk salts by condensing the milk, subjecting the same to a low temperature until the sugar and salts crystallize and filtering out the crystallized sugar and salts by means of a centrifugal.

3. The process of manufacturing sugar of milk by condensing the milk, subjecting the milk to a low temperature to crystallize the sugar, filtering out the crystallized sugar by means of a centrifugal and a suitable filtering material, and washing the extracted sugar to remove the impurities.

4. The process of manufacturing sugar of milk by condensing the milk, subjecting the same to a low temperature to crystallize the sugar, filtering out the crystallized sugar by means of a centrifugal and a suitable filtering material, and washing the extracted sugar with water at a low temperature to remove the impurities.

5. The process of manufacturing sugar of milk by condensing the milk, causing the sugar of milk to crystallize, filtering out the crystallized sugar by means of a suitable filtering material in a centrifugal, and washing the extracted sugar-crystals with water at a low temperature.

6. The process of manufacturing sugar of milk by condensing the milk, subjecting the same to a low temperature until the sugar crystallizes, filtering out the crystallized sugar by means of a suitable filtering material in a centrifugal, and washing the extracted crystals with alkaline water at a low temperature.

7. The process of manufacturing sugar of milk by condensing the milk to between 11° and 27° Baumé, subjecting the condensed milk to a temperature near to 32° Fahrenheit until the sugar crystallizes, extracting the crystallized sugar by means of a suitable filtering material in a centrifugal, and washing the sugar-crystals with alkaline water at a temperature below 50° Fahrenheit.

8. The process of manufacturing milk salts by condensing the milk, subjecting the condensed milk to a low temperature until the salts crystallize, extracting the crystallized salts by means of a suitable filtering material in a centrifugal, washing the salts away from the sugar with water at a low temperature, and recrystallizing the salts from the wash-water in which they are dissolved.

In testimony whereof I have signed my name to this specification in the presence of two subscribing witnesses.

SAMUEL RIDGWAY KENNEDY.

Witnesses:
R. C. SNYDER,
JOHN DOLMAN.